OR  3,963,323

United States

Arnold

[11] 3,963,323

[45] June 15, 1976

[54] FIBER OPTIC CONNECTOR WITH PROTECTIVE CABLE SLEEVES

[75] Inventor: Bruce K. Arnold, El Toro, Calif.

[73] Assignee: International Telephone and Telegraph Corporation, New York, N.Y.

[22] Filed: Dec. 23, 1974

[21] Appl. No.: 536,024

[52] U.S. Cl. ............................. 350/96 C; 350/96 B
[51] Int. Cl.² ........................................... G02B 5/14
[58] Field of Search ............ 350/96 BC, 96 B, 96 C, 350/96 R

[56]  References Cited
UNITED STATES PATENTS

| | | | |
|---|---|---|---|
| 3,471,215 | 10/1969 | Snitzer | 350/96 B |
| 3,610,231 | 10/1971 | Takahashi et al. | 350/96 BC |
| 3,643,653 | 2/1972 | Takahashi et al. | 350/96 BC |
| 3,644,725 | 2/1972 | Lochridge | 350/96 R |
| 3,712,984 | 1/1973 | Lienhard | 350/96 R |
| 3,758,784 | 9/1973 | Vischulis | 350/96 B |
| 3,858,577 | 11/1975 | Bass et al. | 350/96 BC |
| 3,889,662 | 6/1975 | Mitsui | 350/96 BC |

Primary Examiner—John K. Corbin
Assistant Examiner—Jon W. Henry
Attorney, Agent, or Firm—Thomas L. Peterson

[57]  ABSTRACT

A fiber optic cable for use in a fiber optic connector has a protective sleeve pressed on the end of the fiber optic bundle of the cable with an inwardly extending flange which forms a protective spacer for the end surface of the bundle so that when two cables are mated in abutting relationship the end surfaces of the fiber bundles are spaced apart, preventing end surface bundle scratching which causes excessive light diffusion and results in light reception losses.

7 Claims, 4 Drawing Figures

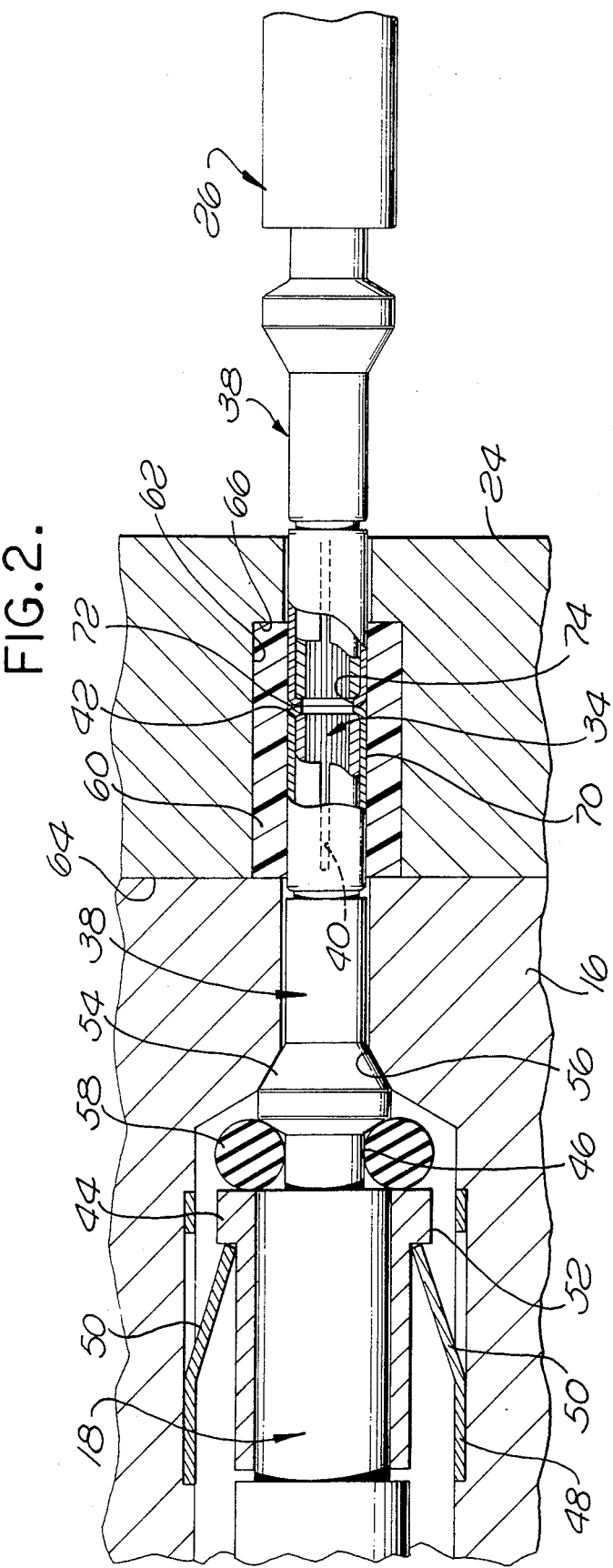
FIG. 2.
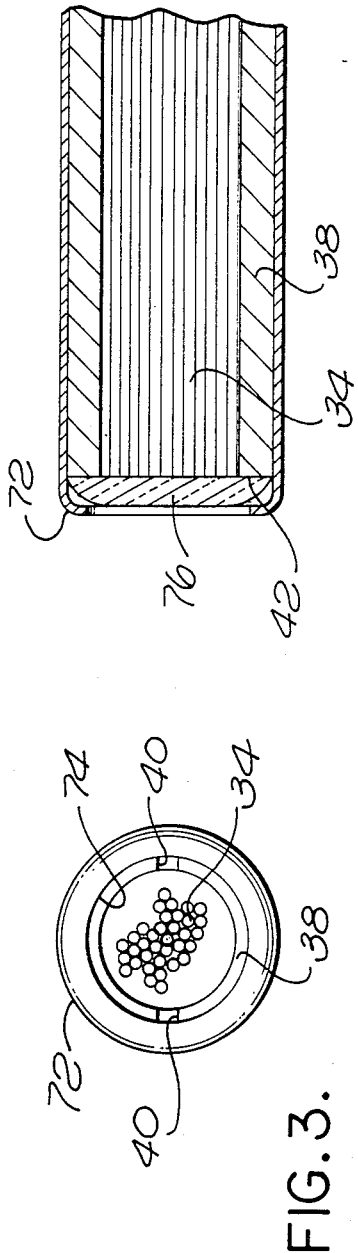
FIG. 4.
FIG. 3.

FIBER OPTIC CONNECTOR WITH PROTECTIVE CABLE SLEEVES

CROSS-REFERENCE TO RELATED APPLICATIONS

This application is related to the following copending U.S. applications of Ronald L. McCartney assigned to the same assignee as the present application:
1. Application entitled "Fiber Optic Connector with Split Tine Optic Contact Arrangement," Ser. No. 510,310, filed Sept. 30, 1974
2. Application entitled "Fiber Optic Connector with Axial Tolerance Relief," Ser. No. 518,488, filed Oct. 29, 1974, abandoned in favor of continuation-in-part application, Ser. No. 597,943, filed July 21, 1975 now U.S. Pat. No. 3,947,182.
3. Application entitled "Deformable Plastic Fiber Optic Connection Alignment Sleeve," Ser. No. 529,620, filed Dec. 5, 1975, abandoned in favor of continuing application, Ser. No. 613,053, filed Sept. 15, 1975.

BACKGROUND OF THE INVENTION

The present invention relates to connectors and, more specifically, to connectors for fiber optic cables.

The employment of fiber optic cables or light guides, also sometimes referred to as optical communication fibers, for the transmission of information-bearing light signals, is now an established art. Much development work has been devoted to the provision of practical low-loss glass materials and production techniques for producing glass fiber cables with protective outer coatings or jackets. The jacket makes them resemble ordinary metallic-core electrical cable upon superficial external inspection. Obviously, if fiber optic cables are to be used in practical signal transmission and processing systems, practical connectors for the connection and disconnection of fiber optic cables must be provided.

Before the prior art in respect to connectors, per se, is discussed, some references will be given for background in the state of fiber optic art in general.

An article entitled, "Fiber Optics," by Narinder S. Kapany, published in *Scientific American*, Vol. 203, pgs. 72–81, November 1960, provides a useful background in respect to some theoretical and practical aspects of fiber optic transmission.

Of considerable relevance to the problem of developing practical fiber optic connectors, is the question of transfer efficiency at the connector. Various factors, including separation at the point of abutment, and lateral separation or offset, are among the factors effecting the light transfer efficiency at a connector. In this connection, attention is directed to the *Bell System Technical Journal*, Vol. 50, No. 10, December 1971, specifically to an article by D. L. Bisbee, entitled, "measurement of Loss Due to Offset, and End Separations of Optical Fibers". Another *Bell System Technical Journal* article of interest appeared in Vol. 52, No. 8, October 1973, and was entitled, "Effect of Misalignments on Coupling Efficiency on Single-Mode Optical Fiber Butt Joints," by J. S. Cook, W. L. Mammel and R. J. Grow.

The patent literature also contains much information relative to the state of this art. For example, U.S. Pat. No. 3,624,816 describes a "Flexible Fiber Optic Conduit". The device described therein uses a plurality of light conducting fibers in a flexible cable-type arrangement.

Concerning the utility of fiber optic cables and therefore the utility of connectors for such cables, various systems are described in the patent literature which employs fiber optic cables. One example of such a utilization system is described in U.S. Pat. No. 3,809,908, "Electro-Optical Transmission Line".

Yet another patent of interest is entitled, "Glass Fiber Optical Devices," U.S. Pat. No. 3,589,793. This reference relates to the fiber optic bundles and the glass fibers themselves as well as to a method of fabrication for the fiber optic elements themselves.

A selection of U.S. patents relating more particularly to optical cable connectors includes U.S. Pat. Nos. 3,790,791; 3,734,594; 3,637,284; 3,572,891; 3,806,225; 3,758,189 and 3,508,807. These patents are representative of the connector prior art.

A fiber bundle-to-fiber bundle connector design requires the polished bundle ends to be positioned and held in close proximity. The most direct way to accomplish this is to butt the bundle ends together. Reference is made to said copending application Ser. No. 518,488 which discloses a fiber optic connector construction embodying means which provides a positive abutment force at the interface of the fiber bundles. When the ends of the fiber bundles are in abutting contact, repeated matings of the connector members in which the bundles are mounted and movement due to vibration can cause bundle surface scratching, especially when grit is present in the connector. The result is excessive light diffusion, causing optical losses at the abutting bundle interface. Losses due to surface scratching may amount to 4-db or more. The purpose of the present invention is to provide a fiber optic cable arrangement which eliminates scratching of the end surfaces of the fiber bundles with optical power losses less than that which results from surface scratching.

SUMMARY OF THE INVENTION

According to the principal aspect of the present invention, there is provided a fiber optic cable for use in a fiber optic connector wherein a hollow termination body substantially surrounds the end of the fiber optic bundle of the cable. The body has an end surface coplanar with the planar end surface of the fiber bundle. Typically, the end surfaces of the fiber bundle and hollow termination body are optically polished. A sleeve is pressed on the end of the body. The sleeve has a flat annular flange at its end which extends inwardly over the end of the body providing an optical window for the fiber bundle. When two fiber optic cables having such sleeves thereon are brought into axial abutting contact with each other in a fiber optic connector, the flanges on the sleeves provide protective spacers, spacing the end surfaces of the bundles apart thereby preventing scratching of the bundle end surfaces. Thus, the present invention eliminates optical losses due to excessive light diffusion resulting from the scratching of the end surfaces of the fiber bundles. The flanges have a sufficiently small thickness so that the gap between the fiber bundle ends resulting from the flanges therebetween results in only minor losses in optical transfer between the cables.

BRIEF DESCRIPTION OF THE DRAWINGS

FIG. 2 is a fragmentary partial longitudinal sectional view of the connector showing the details of structure of the abutting ends of the fiber optic cables employed in the connector;

FIG. 3 is an end view of one of the cables illustrated in FIGS. 1 and 2; and

FIG. 4 is a longitudinal sectional view through the end portion of a modified form of the cable of the present invention.

DESCRIPTION OF THE PREFERRED EMBODIMENTS

Figure 1:
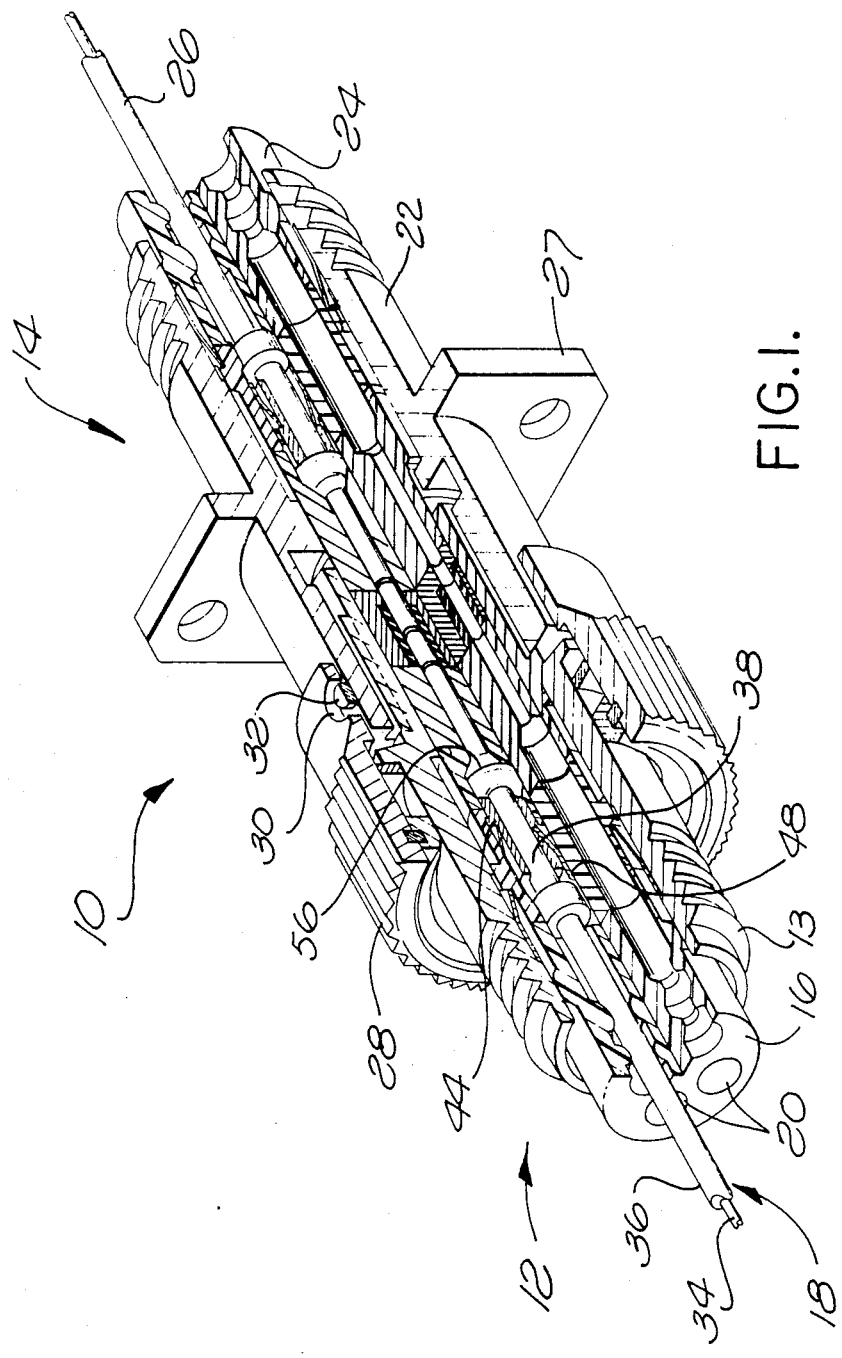
FIG. 1 is a partial cutaway perspective view of a fiber optic connector showing the connector members mated and a single pair of signal connected fiber optic cables therein.

Referring now to the drawings in detail, wherein like reference characters designate like or corresponding parts throughout the various views, there is illustrated in FIG. 1 a fiber optic connector assembly generally designated 10 comprising a plug connector member 12 mated to a receptacle connector member 14. The plug connector member 12 comprises a shell 13 containing a support member 16 which supports a plurality of fiber optic cables 18, only one being illustrated for purposes of clarity. It is noted that the support member 16 contains four axially extending passages 20 therethrough for holding fiber optic cables. It will be appreciated that any number of cables may be mounted in the connector member 12.

The mating receptacle connector member 14 also includes a shell 22 containing a support member 24 for fiber optic cables 26 equal in number to the cables 18 in plug connector member 12 and axially aligned therewith. The shell 22 has a mounting flange 27 thereon for mounting the connector 10 to a suitable panel or the like. The plug connector member 12 carries a rotatable coupling nut 28 having an arcuate slot 30 therein which cooperates with a pin 32 on the shell 22 to provide a bayonet connection between the two connector members, as well known in the electrical connector field, which allows the two connector members to be mated upon rotation of the coupling nut 28.

The support members 16 and 24 in the connector shells may be single pieces or multiple piece arrangements, as illustrated in FIG. 1.

The fiber optic cables 18 and 26 are identical and therefore only one of such cables 18 will be described, it being understood that the description thereof is applicable to the other cable 26. The various components of the cables will be designated by the same reference numerals. The cable 18 comprises a fiber optic bundle 34 with a jacket 36 surrounding the bundle. A termination pin 38 terminates the end of the bundle 34. Preferably, the pin is a hollow body having at least one axially extending slot 40 therein which extends from the forward end 42 of the body a predetermined distance toward the rear end thereof. Preferably, a pair of slots are provided, as best seen in FIG. 3. This arrangement provides a "split tine" or "spring tine" device for firmly gripping and compressing the individual glass fibers in the fiber bundle 34 in the vicinity of the point of interface abutment between the cables 18 and 26. This split tine arrangement is described in detail in the aforementioned copending applications Ser. No. 510,310.

A collar 44 is slidable on the pin 38 behind an annular groove 46 in the pin. A spring retention element 48 is mounted in the support member 16 surrounding the collar 44. The retention element has a pair of forwardly and inwardly extending spring fingers 50 engaging a rearwardly facing shoulder 52 on the collar 44 limiting rearward movement of the termination pin 38 in the support member 16. The pin is also formed with a forwardly facing tapered shoulder 54 which engages a rearwardly facing surface 56 on the support member 16 to limit forward movement of the termination pin in the connector. A resilient annular ring 58 lies within the groove 46 for axial tolerance relief as described in greater detail in the aforementioned pending application Ser. No. 518,488. The mounting arrangement for the termination pin on the cable 26 may be identical to that employed in the support member 16 for the termination pin on cable 18.

When the connector members 12 and 14 are mated together, the ends of the termination pins 38 for the two fiber optic cables 16 and 26 abut each other in axial alignment. In order to assure that axial alignment is achieved between the opposed termination pins, an elastomeric sleeve 60 is provided in a recess 62 in the support member 24. The sleeve surrounds the abutting ends of the pins 38. The length of the sleeve 60 is greater than the distance between the front face 64 of the support 24 and the bottom 66 of recess 62 so that when the connector members are mated the support member 16 will apply compressive force to the end of the sleeve 60 causing it to contract radially inwardly, tightly fitting around the ends of the pins 38 and effecting a very accurate axial alignment therebetween. For further details of this alignment arrangement, reference may be had to the aforementioned copending application Ser. No. (McCartney-6).

The specific structure described herein for the termination pin 38, the mounting arrangement therefor in the support 16, and the axial alignment sleeve 60 are given by way of example only and constitute no part of the present invention. As will be seen from the following description, the advantages of the present invention will be achieved in any fiber optic connector wherein fiber bundles are axially aligned in abutting relationship. In accordance with the invention, a protective spacer is provided over the forward ends of the aligned fiber bundles so that the faces of the bundles will be spaced apart and will not be subjected to abrasion as normally occurs when the bundles are mated in direct abutting relationship. Preferably, the forward end of the fiber bundle 34 and the end surfce 42 of the pin 38 are optically polished to provide a coplanar flat surface. A metal sleeve 70 is then pressed over the forward end of the pin 38. The sleeve embodies a flat annular flange 72 which extends radially inward over the end 42 of the pin 38. Preferably, the inwardly extending flange stops short of the end of the fiber bundle 34 so as to not interfere with light transmission therethrough and thereby provide a circular optical window for the fiber bundle. In other words, the diameter of the window 74 is greater than the inner diameter of the forward end of the split tine retention pin 38. Since the flange 72 extends over the planar face of the fiber bundle 34, it provides a protective spacer which assures that the fiber bundle face will not abut against the opposed fiber bundle face at the end of the cable 26 when the cables 18 and 26 are mated in abutting relationship as illustrated in FIG. 2 upon interengagement of the connector members 12 and 14. It will be appreciated that as a practical matter only one of the fiber optic cables of the aligned pair of cables 18, 26 need be provided with a protective sleeve since a single flange 72 will assure spacing between the polished end faces of the fiber bundles in the cables. Nevertheless, it is preferred that all the cables in the connector be provided with the protective sleeve 70.

It is desirable that the thickness of the sleeve 70, and hence the thickness of the flange 72, be as small as possible. Typically, the thickness of the wall of the protective sleeve 70 is less than the thickness of the wall of the end termination pin 38. To maintain optical power losses below about 0.2 db due to the spacing between the ends of the fiber bundles, it is preferred that the thickness of the flange 72 be not greater than about 0.002 inch, which will result in a 0.004 inch gap between the end faces of the bundles. While the gap between the bundles does result in a loss in optocal transmission through the connector, this loss is substantially less than that which normally occurs due to the scratching of the end surfaces of the bundles, which may amount to 1 db or more. The effect of having the protective sleeve to reduce optical losses becomes more significant when the amount of in-field use of the connector increases where the fiber bundles would otherwise be subjected to greater scratching, particularly when grit is present, resulting in excessive light diffusion.

Reference is now made to FIG. 4 of the drawings which shows a modification of the forward end of the fiber optic cable of the present invention. This cable is identical to that already described except that an optical interface element 76 is disposed between the flange 72 and the end surface of the fiber optic bundles 34 so that the element is firmly held in position by being clamped between the flange and end surface 42 of the pin 38. The optical interface element may comprise a light concentrating lens, as illustrated, or an index matching material, such as an index matching gel or elastomer, as well known in the art. The provision of the interface element 76 behind the protective flange 72 assures that the element will not be scratched upon abutting contact with the end of the mating fiber optic cable in the connector.

While the invention has been described in connection with a fiber optic bundle containing a plurality of fibers, it will be appreciated that the protective sleeve could be provided on a single fiber, if desired.

The present invention not only assures that light transmission losses will be minimized when the connector of the present invention is used in typical field environments, where abrasion of the faces of the fiber bundles would otherwise occur due to dust or grit, the invention also provides protection for the fiber bundle ends when the cables are being shipped or handled during assembly.

What is claimed is:

1. A fiber optic connector for joining the ends of a pair of fiber optic bundles comprising:

first and second fiber optic cables each containing a fiber optic bundle including a plurality of light transmitting fibers terminating in a planar end surface;

first and second mating connector members containing said first and second cables, respectively;

each said cable including a hollow body substantially surrounding the end of its respective bundle and having one end coplanar with said end surface of said bundle;

each said cable also including a sleeve surrounding its respective hollow body, said sleeve having at one end thereof a flat annular flange extending inwardly over said end of said body providing an optical window for said bundle, said flat annular flange lying in a plane parallel to said planar end surface; and means in said connector members positioning said cables in axial alignment and causing said flanges at the ends of said cables to abut each other when said connector members are mated whereby said planar end surfaces of said bundles are axially spaced apart.

2. A fiber optic connector as set forth in claim 1 wherein:

each said sleeve is formed of metal and has a uniform wall thickness less than the thickness of the wall of said hollow body.

3. A fiber optic connector as set forth in claim 1 wherein:

each said hollow body has at least one axially extending slot through the wall thereof from said one end to a predetermined distance toward the other end of said body providing spring-tine means firmly gripping and compressing said bundle in said body.

4. A fiber optic connector as set forth in claim 3 wherein:

said slotted end of each said hollow body is press-fit into its respective sleeve.

5. A fiber optic connector as set forth in claim 1 including:

an optical interface element disposed over said planar end surface of each said bundle having its outer perimeter securred between said one end of said body and said annular flange.

6. A fiber optic connector as set forth in claim 1 wherein:

said flange of each said sleeve is contiguous with said one end of its respective hollow body.

7. A fiber optic connector as set forth in claim 1 wherein:

the inner perimeter of said flange of each said sleeve lies outside of the outer perimeter of the fiber optic bundle of its respective fiber cable.

* * * * *